United States Patent [19]
Brooks, Jr. et al.

[11] 3,734,534
[45] May 22, 1973

[54] MOUNTING STEP FOR AUTOMOTIVE VEHICLE

[76] Inventors: Paul Brooks, Jr., 621 Northeast 78th Street; Clarence O. Teeters, 10211-12th Avenue Northeast, both of Seattle, Wash.

[22] Filed: Apr. 22, 1971

[21] Appl. No.: 136,380

[52] U.S. Cl..................................280/163, 280/165
[51] Int. Cl.................................................B60v 3/02
[58] Field of Search......................280/163, 166, 291

[56] References Cited

UNITED STATES PATENTS

| 2,218,060 | 10/1940 | Watson | 280/166 |
| 3,484,829 | 12/1969 | Erickson | 280/291 |
| 3,096,841 | 7/1963 | May | 280/291 |

Primary Examiner—Leo Friaglia
Assistant Examiner—Robert R. Song
Attorney—Graybeal, Cole & Barnard

[57] ABSTRACT

In a automotive vehicle having an access door above a front wheel, a removable step assembly located at the center of a front wheel and mounted to the front spindle of the automobile. There is a first mounting member comprising an extension nut which is threaded onto and locked to the front spindle. At the outer end of the extension nut is a hexagonal locking head connected by a neck portion of reduced diameter. The removable step has at its inner end a locking member comprising a pair of downwardly extending arms which reach around the neck of the extension nut, and is formed with a locking recess which mates with the locking head. A spring member mounted to the step adjacent the two locking arms holds the step in place and prevents any rattling of the step. A locking tab secures the extension nut to the automobile's front spindle.

11 Claims, 6 Drawing Figures

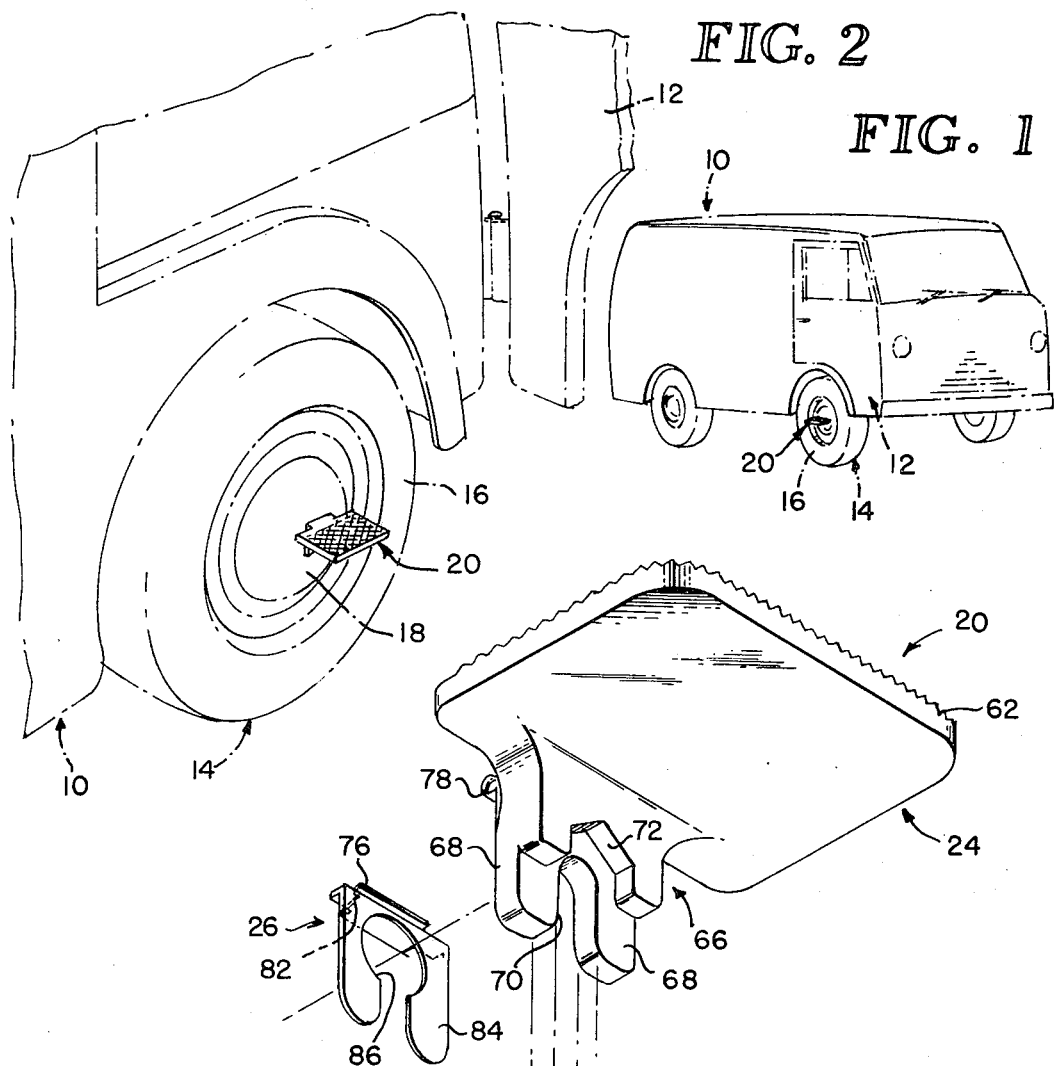
FIG. 2
FIG. 1
FIG. 3
PAUL BROOKS JR.
CLARENCE O. TEETERS
INVENTOR.
BY
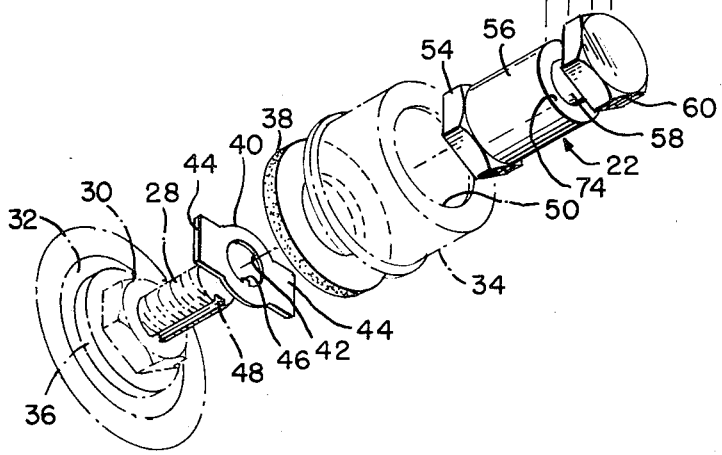
ATTORNEYS

PATENTED MAY 22 1973 3,734,534

PAUL BROOKS JR.
CLARENCE O. TEETERS
INVENTOR.

BY
*Graybeal, Cole & Barnard*
ATTORNEYS

MOUNTING STEP FOR AUTOMOTIVE VEHICLE

BACKGROUND OF THE INVENTION

1. Field of the Invention

The present invention relates to a removable step especially adapted for use in van type automobiles where the front door is directly above the front wheel of the automobile.

2. Description of the Prior Art

For van type automobiles wherein the access door is mounted above a front wheel, there is no prior art known to the applicant where the access step is removably mounted to the wheel spindle for easy ingress and egress through the doorway. Perhaps the most relevant prior art is that shown in U.S. Pat. No. 1,149,338, wherein a step is splined onto the axle of the vehicle and wedged fixedly thereon by means of several locking keys for use, for example, by a delivery boy riding outside the vehicle by standing on the step.

One of the problems of providing a removable access step in the area of a front wheel of a modern day van type automotive vehicle is that the step may be easily removable to permit repairs to and service of the vehicle (e.g., changing a flat tire, packing the front wheel bearings, etc.). On the other hand, the step must be securely mounted to the automotive vehicle to insure the safety of a person either entering or leaving the vehicle. To the best knowledge of the applicants herein, such a device does not exist in the prior art.

Thus, it is an object of the present invention to provide for a van type automotive vehicle having an access door above a wheel of said vehicle, an access step which is easily removable and yet can be securely mounted to the spindle of the vehicle wheel for easy access into and egress from the vehicle through the door above the wheel.

SUMMARY OF THE INVENTION

The present invention comprises, in combination with an automotive vehicle having a spindle with a ground wheel mounted thereon and an access door above the wheel, a removable step assembly comprising a mounting member rigidly attached to said spindle and having first interlocking means comprising an outer locking head and a neck of reduced diameter spaced inwardly therefrom, and a step member having interlocking means engageable with the head and neck portion of the first member, which interlocking means comprises a pair of arms which fit about the neck portion of the mounting member and an interlocking recess which interfits with the locking head. A holding spring having a pair of arms which fit around the neck portion of the mounting member holds the step securely to the mounting member.

DESCRIPTION OF THE DRAWINGS

FIG. 1 is an isometric view of a van type automotive vehicle with the apparatus of the present invention installed thereon;

FIG. 2 is an isometric view of a portion of the vehicle of FIG. 1, again showing the apparatus of the present invention installed thereon;

FIG. 3 is an exploded view showing the components of the present invention;

DESCRIPTION OF THE PREFERRED EMBODIMENT

Figure 4:
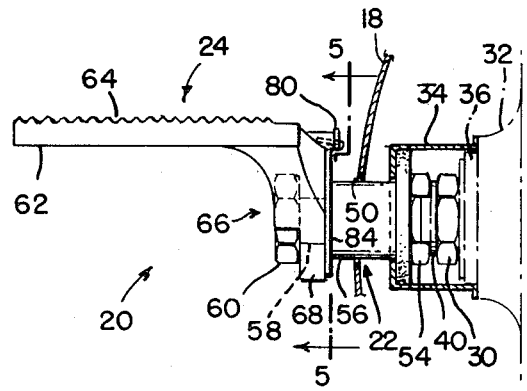
FIG. 4 is a front elevational view of the apparatus of the present invention.
Figure 5:
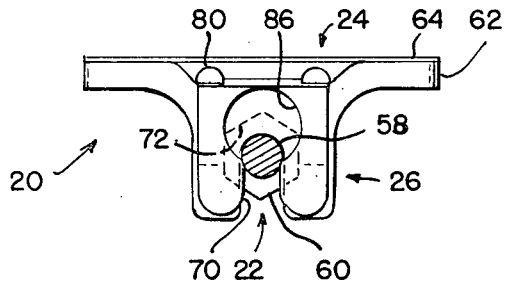
FIG. 5 is a sectional view taken along line 5—5 of FIG. 4.
Figure 6:
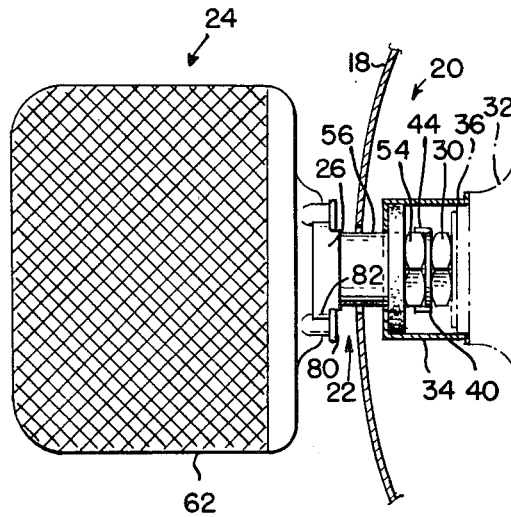
FIG. 6 is a top view of the present invention.

In FIGS. 1 and 2, there is shown a van type automotive vehicle 10 having a front access door 12 located directly above the right front wheel 14 of the vehicle 10. The wheel comprises a tire 16, and has a hub cap 18.

To provide convenient ingress and egress through the front doorway, there is provided a step assembly, generally designated 20. This step assembly has three main components: a mounting member 22 which ordinarily remains fixed to the front spindle of the automobile; a step member 24 which interlocks with and is easily removable from the mounting member 22; and a retaining spring member 26 which holds the other two members 22 and 24 securely in interlocking relationship.

With reference specifically to FIG. 3, the existing front spindle of the automobile comprises at its outer end a threaded stud 28 on which are threaded one or more jam nuts (one of which is shown at 30), which press against a bearing plate 32 which retains the wheel 14 on the front spindle. A dust cap 34 is mounted to an annular shoulder 36 of the bearing plate 32, and a dust seal 38 fits within the cap 34 and around the stud 28. In some vehicle models, there is a retaining tab 40 which fits around the stud 28 to hold the jam nut 30 in place. This tab 40 has a center opening 42 and two oppositely extending ears 44 which can be bent around two opposite faces of the jam nut 30. To prevent rotation of the jam nut 30 and the tab 40, the tab has an inwardly protruding finger 46 which fits in a related slot 48 formed lengthwise in the stud 38. These components numbered 28 through 48 and described above, exist in the prior art in present day automobiles. To utilize the apparatus of the present invention, the only modifications needed are that a center hole 50 be formed in the dust cap 34 and a center hole 52 be formed in the wheel hub cap 18.

To describe now the step assembly 20 of the present invention, the aforementioned mounting member 22 is formed as an extension nut which comprises: an inner hexagonal nut portion 54, a shank portion 56 extending outwardly therefrom, a neck portion 58 of a diameter smaller than the shank portion 56 and extending outwardly therefrom, and an outer locking head 60 which, as shown herein, is of hexagonal configuration. The inner end of the mounting member 22 is internally threaded so that it can be threaded onto the external threads of the spindle stud 28. After the mounting member 22 is so threaded on the stud 28, the aforementioned retaining tab 40 (which is positioned between the existing jam nut 30 and the inner nut portion 54 of the mounting member 22) has its ears bent around opposite sides of the inner nut portion 54 to retain the mounting member 22 to the front spindle. The mounting member 22 is so dimensioned that the neck portion 58 and locking head 60 thereof extend moderately beyond the outer surface of the hub cap 18. After the mounting member 22 is threaded onto the stud 28 and retained thereon by means of the tab 40, it ordinarily remains there and does not need to be removed for servicing of the car, changing a tire, etc.

The aforementioned step unit 24 comprises a horizontal stepping plate 62 having a serrated or roughened upper surface 64. Integral with the stepping plate 62 and extending downwardly from its inner part is a mounting portion 66 which interlocks with the mounting member 22. This mounting portion 66 comprises two spaced downwardly extending arms 68 which define a vertical, downwardly open slot 70 into which the neck portion 58 fits when the two arms 68 are moved downwardly around the neck portion 58.

Immediately adjacent to the two arms 68 there is formed in the mounting portion 66 of the step unit 24 a recess 72 which is shaped (as a portion of a hexagon as shown herein) to mate in interlocking relationship with the locking head 60 of the mounting member 24. When the step unit 24 is moved downwardly onto the mounting member 22, the two arms 68 of the step unit fit around the neck 58 of the mounting unit 22 so as to become wedged between the locking head 60 and the annular shoulder 74 of the shank portion 56 adjacent the neck 58. The locking head 60 mates with the recess 72 of the step unit 24, so that the step unit 24 is prevented from rotating about the longitudinal axis of the mounting member 22.

The aforementioned spring unit 26 is formed from a resilient metal sheet material and has an upper mounting portion 76 which is formed by folding the plate back over on itself. This mounting portion 76 thus forms a horizontal slot which fits over a related flange 78 formed at the inner edge of the step unit 24. The step unit has at its inner edge a pair of ears 80 which engage two outwardly extending protrusions 82 formed on the mounting portion 76 to hold the spring unit securely to the step member.

Extending downwardly from the mounting portion 76 of the spring unit 26, are two spring arms 84. These two arms 84 define a middle opening 86 and reach down and around the neck portion 58 of the mounting member 22. The two arms 84 can be sprung moderately outward so as to resiliently grip the neck portion 58 and hold the step unit 24 in place on the mounting member 22.

In addition, the two spring arms 84 are bent moderately toward the inner portion of the mounting member 22. Thus, these two arms 84, being positioned between the annular shoulder 74 of the shank 56 and the inner surface of the two mounting arms 68 of the step unit 24, take out any wobble that there might be between the step unit 24 and the mounting member 22. Thus, the spring 26 performs the dual function of resiliently holding the step unit 24 in locking relationship with the mounting member 22 and eliminating rattle.

To describe the manner of using the apparatus of the present invention, as previously indicated, it is first necessary to form a hole 50 in the existing dust cap 34 and a hole 52 in the existing hub cap 18 to accommodate the mounting member 22. The hub cap 18 and dust cap 34 are removed from the wheel 14, and the mounting member 22 is threaded onto the spindle stud 28. When the mounting member is properly in place with its locking head 60 in proper vertical alignment, the two ears 44 of the retaining tab 40 are bent outwardly to hold the mounting member 22 in place. Then the dust seal 38 is inserted over the mounting member 22, and the dust cap 34 is placed over the dust seal and around the mounting member 22. Next the hub cap 18 is placed on the wheel 14.

When it is desired to use the step unit 24 for entering the car 10 through the doorway 12, the step unit 24 with the step plate 62 positioned horizontally is moved downwardly onto the mounting member 22. The two mounting arms 68 fit securely around the neck portion 58 of the mounting member 22, with the spring unit 26 performing its dual function of resiliently holding the step unit 24 in place and eliminating any rattle of the step unit 24. The locking head 60 and the mating recess 72 in the step unit interfit with one another to prevent any rotation of the step unit 24 from its horizontally aligned position. When it is desired to remove the step unit 24 (for service of the car, changing a tire, etc.), the stepping plate 62 is grasped and lifted upwardly to bring the step unit 24 out of interlocking engagement with the mounting member 22.

What is claimed is:

1. In an automotive vehicle having a longitudinal axis from front to rear, transverse axis extending from side to side and a vertical axis, said automobile having a spindle with a ground wheel mounted thereon, and an access door above the wheel, the improvement a step assembly comprising in combination:
   a. a mounting member rigidly attached to said spindle and having first interlocking means thereon, said first interlocking means including a locking head integrally secured at the outer end of said mounting member and a neck portion of reduced diameter spaced inwardly from said locking head,
   b. a step member having second interlocking means engageable with said first interlocking means by movement thereto in a direction generally perpendicular to the transverse axis of the vehicle, said second interlocking means comprising a slotted portion adapted to engage said neck, and a locking head mating portion adapted to interlock with said head, whereby when said step with its second locking means, is moved into locking engagement with the first locking means, said step member is held rigidly to said mounting member and said spindle for convenient ingress and egress into and from the vehicle access door.

2. The apparatus as recited in claim 1, wherein said vehicle spindle has an outwardly extending threaded stud thereon, and said mounting member has internal threads by which it is mounted to said stud.

3. The apparatus as recited in claim 2, wherein said mounting member is an extension nut which threadedly engages said stud.

4. The apparatus as recited in claim 3, wherein there is a locking tab mounted to and fixed rotationally with, and engaging said extension nut so as to resist rotation of the extension nut.

5. The apparatus as recited in claim 1, wherein there is a spring retention member adapted to fit adjacent said slot means and said neck portion so as to press against said mounting member and said step member to accomplish firm interlocking of the first and second locking means.

6. The apparatus as recited in claim 5, wherein said spring is attached to the step member and yieldingly grips said neck portion so as to resist unlocking movement of said first and second interlocking means.

7. The apparatus as recited in claim 6, wherein said spring has a pair of arms which reach around said neck portion.

8. The apparatus as recited in claim 1, wherein said first and second interlocking means come into engagement by movement of said step member with its second interlocking means generally downwardly onto said first locking means so that said first and second locking means come into interfitting relationship with one another.

9. The apparatus as recited in claim 8, wherein said second interlocking means comprises a pair of vertically aligned arms having a downwardly open slot which comes into locking engagement with said first interlocking means.

10. The apparatus as recited in claim 9, wherein said second interlocking means comprises a neck portion of reduced diameter and a locking head of increased diameter spaced outwardly from said neck portion and said second interlocking means has a recess portion adjacent its two arms to engage said locking head.

11. The apparatus as recited in claim 10, wherein said mounting member has an inner shoulder adjacent said neck portion, and the two arms of the second interlocking means fit around the neck portion and between the locking head and the inner shoulder.

* * * * *